United States Patent Office 3,395,548
Patented Aug. 6, 1968

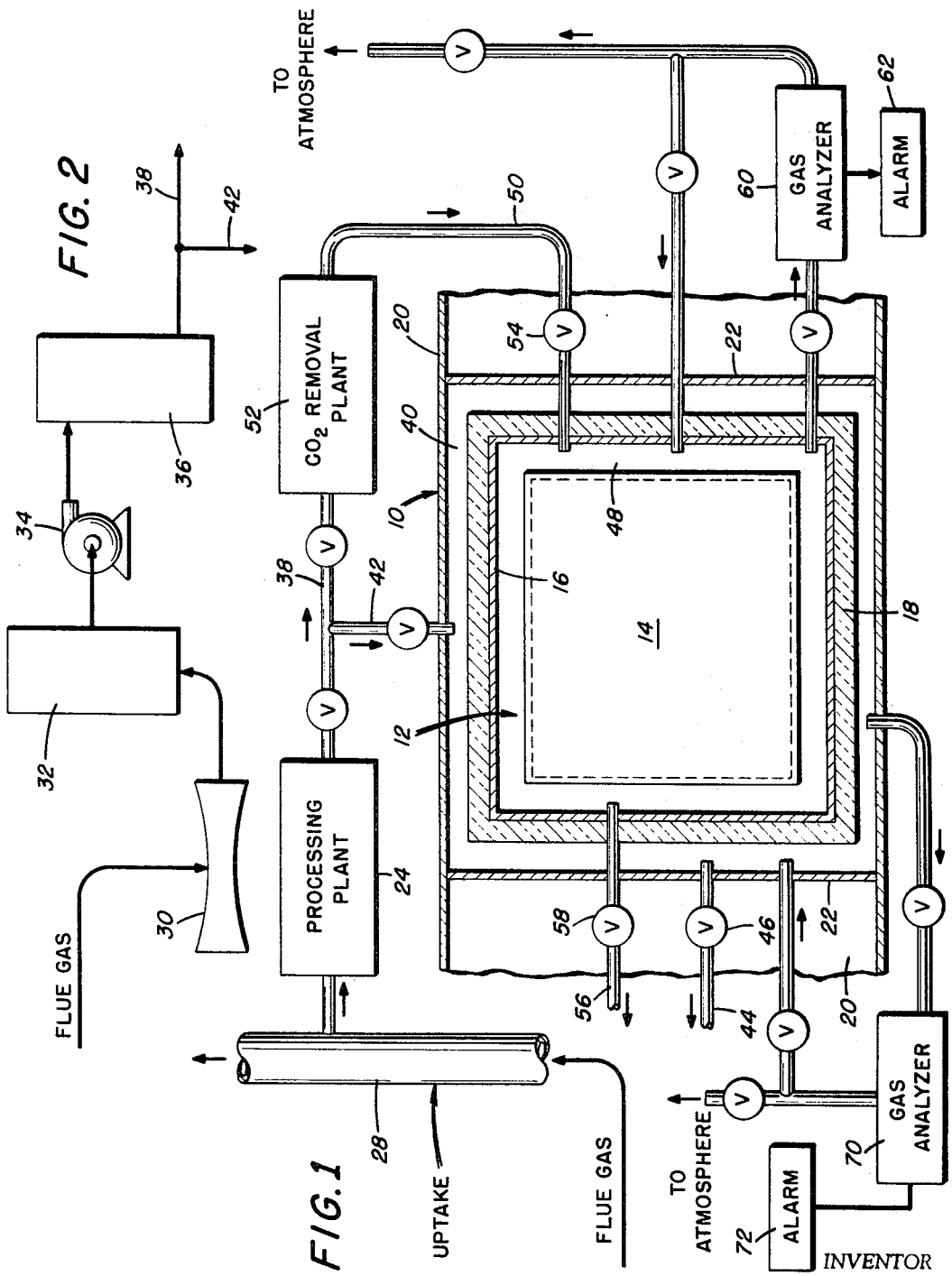

3,395,548
VESSEL FOR TRANSPORTING LIQUEFIED GAS AT ABOUT AMBIENT PRESSURE
Donald R. Yearwood, Parlin, N.J., assignor to
John J. McMullen, Montclair, N.J.
Filed Nov. 7, 1966, Ser. No. 592,643
7 Claims. (Cl. 62—45)

ABSTRACT OF THE DISCLOSURE

A vessel comprising a hull, a cargo tank mounted within the hull for carrying liquefied gas cargo at about ambient pressure, said tank including an inner tank for housing the liquid cargo and an outer tank having inner surfaces spaced from said inner tank to form an outer tank space therebetween, a source of flue gas and processing means for providing said outer tank space with purified flue gas which is substantially free of carbon dioxide. For further protection, flue gas fills the void space about the outside of the tank and within the ship's hull but the flue gas in the void space contains carbon dioxide. The pressure in the outer tank is maintained greater than the pressure in the void space and gas analyzers detect changes in the gas content in the outer tank and void space and actuate leak indicators in the event cargo gas is detected in the outer tank or the carbon dioxide p.p.m. decreases in the void space flue gas.

---

The present invention relates to ships for transporting liquefied gas at about ambient pressure and more particularly to ships of this type wherein the storage tanks comprise a double wall tank wherein the inner tank houses the liquefied cargo and the outer tank houses an inert gas for the protection of the system.

It is generally known that the volatile nature of liquefied petroleum gases transported on ships of the type described creates an extremely dangerous condition in the event the tank develops leaks or cracks in the primary barrier. It is conventional to purge the outer tank with an oxygen free gas so that if the inner barrier develops a leak, there is no chance of oxygen mixing with the cargo gas and increasing the chances of explosion. The gas in the outer tank must have a sublimation and condensation temperature below that temperature of the liquefied contents of the inner tank in order to keep the interior of the outer tank dry. Because it meets these requirements and can be cheaply extracted from air, nitrogen has been favored for use as an inert in the outer tank. However, the use of nitrogen requires great expense to cool it down to a sufficient temperature to be placed into the tank.

It is the purpose of the present invention to avoid the above problems by using purified flue gas in the outer tank as described, flue gas being in abundant quantities aboard ship.

Briefly stated, flue gas is tapped off a supply source and fed through a processing plant where it is cleaned, dehydrated and cooled. Next, the gas is fed through a carbon dioxide removal plant and subsequently fed into the outer tank until the latter is purged. The flue gas in the outer tank provides the proper oxygen free atmosphere and samples are periodically fed through a gas analyzer is order to determine the presence of cargo gas, which when present indicates a leak condition in the primary barrier.

For those tanks with the outer walls spaced from the ship's supporting structure, the flue gas is fed from the processing plant directly into the void space around the tank. Although purified flue gas fills the outer tank and the void space, the structural integrity of the outer tank wall can be monitored sensing the carbon dioxide parts-per-million. If flue gas in the outer tank leaks into the void space, a gas analyzer detects a $CO_2$ p.p.m. decrease and actuates an alarm.

It is therefore an object of the present invention to provide a tank of the type described with treated flue gas within the outer tank.

It is another object of the present invention to include a leak detection system comprising a gas analyzer which samples the flue gas within the outer tank and checks for the presence of cargo gas and actuates an alarm accordingly.

Another object of the invention is to purge the void space about the tank with processed flue gas.

A further object is to analyze the flue gas atmosphere in the void space about the tank and sense a $CO_2$ p.p.m. decrease which is indicative of a leak in the outer tank wall.

Other and further objects of the present invention will become apparent with the following detailed description when taken in view of the appended drawings in which:

FIGURE 1 is a schematic diagram of the system according to the present invention.

FIGURE 2 is a schematic diagram of a typical processing plant commercially available and well known as a standard piece of marine equipment.

With reference to the drawings, a ship generally indicated as 10 includes a double wall tank 12 which includes an inner tank 14 serving to house the liquefied gas at about ambient pressure, a spaced outer tank 16 acting as a back up barrier for the primary barrier 14, and a blanket of thermal insulation 18 hung about the outer walls 16 to reduce the heat transfer through the tank. In the illustrated example, the ship's hull 20 and bulkheads 22 are spaced from the outer layers of insulation 18 to form a void space about the tank. Tank walls 14 and 16 are made of aluminum, nickel-steel or stainless steel in order to withstand the extreme low temperatures associated with the contents of the tank ($-260°$ F. in the case of methane). One example of such a tank is disclosed in co-pending U.S. patent application Ser. No. 539,489 filed Apr. 1, 1966.

According to the invention, the vessel is outfitted with a commercially available processing plant 24. The input of processing plant is fed from any suitable source of flue gas such as the vessel's uptake 28. With reference to FIGURE 2, the processing plant includes a venturi scrubber 30 to cool and remove ash from the flue gas. Scrubber 30 then feeds the gas to a cooling, absorbing and separating tower 32 which purifies by eliminating moisture, sulfur compounds, and other unwanted ingredients. The flue gas is moved through the processing plant by a blower 34 which is fed from tower 32 and has an output feeding a molecular sieve or desiccant station 36. Upon leaving station 36, the treated flue gas is fed either through line 38 and/or line 42. Treated flue gas through line 42 enters the void space 40 about the outside of the tank. Delivery line 42 feeds an array of discharge pipes (not shown) arranged symmetrically about the tank in order to evenly fill or purge void space 40. A valved exhaust line 44 communicates with space 40 and after space 40 is entirely purged with flue gas, valve 46 is closed to seal the space.

Although the flue gas fed through line 42 has a carbon dioxide content, it needs no further treatment before entering the void space 40 because the anticipated temperature in the void space will be much higher than the sublimation temperature of carbon dioxide. However, the temperature within the outer tank 48 is anticipated to be $-250°$ F. in the case of liquefied methane transport. For this reason, the flue gas through line 38 is fed into a carbon dioxide removal plant 52 then to outer tank 48 via delivery line 50. Such $CO_2$ removal plants are commercially available and can comprise a caustic solution type, molecular sieve type, or mechanical processing (refrigeration) type.

Delivery line 50 feeds the additionally treated flue gas into outer tank 48 and exhaust line 56 provided with valve 58 affords outer tank purging capability for the system. The pressure in the outer tank is set higher than that in the void space so that leakage through wall 16 and insulation 18 is outwardly directed.

Lines 42, 44, 50 and 56 each communicates with an array of nozzled pipes symmetrically positioned within the respective spaces in order to distribute or exhaust the incoming and outgoing gases uniformly throughout the space.

In order to continuously monitor the leak condition of the inner tank wall 14, a conventional gas analyzer 60 provided with its own blower (not shown) draws samples of the gas from outer tank 48, senses for the presence of cargo gas, and feeds the sample of gas either to the atmosphere or back to the outer tank space 48. Analyzer 60 can be of any suitable type such as the infrared or combustion type and actuates an alarm system 62 in response to the presence of cargo gas.

The leak condition of wall 16 and insulation 18 (if it is of the gas impervious, synthetic closed cellular type) is monitored by gas analyzer 70 sensing the $CO_2$ p.p.m. in the void space atmosphere. If a leak develops, flue gas in the outer tank enters the void space and lowers the $CO_2$ p.p.m. This change is detected by analyzer 70 which then actuates alarm 72. Valved lines are provided to feed the sampled gas alternately back into the void space or to the atmosphere.

The operation of the system is apparent from the above description. It will be appreciated that the invention affords many advantages not heretofore obtained with prior known systems. It should be understood that various modifications can be made to the herein disclosed example of the invention without departing from the spirit and scope thereof.

What is claimed is:

1. A vessel comprising a hull, a cargo tank mounted within the hull for carrying liquefied gas cargo at about ambient pressure, said tank including an inner tank for housing the liquid cargo and an outer tank having inner surfaces spaced from said inner tank to form an outer tank space therebetween, a source of flue gas and processing means for providing said outer tank space with purified flue gas which is substantially free of carbon dioxide.

2. A vessel as set forth in claim 1 wherein the outer tank is spaced from the surrounding ship's supporting structure to form a void space, and an atmosphere including purified flue gas provided in said void space.

3. A vessel as set forth in claim 2 wherein thermal insulation covers the outer surfaces of the outer tank, said void space being defined between said insulation and the supporting structure.

4. A vessel as set forth in claim 1 wherein gas analyzing means is provided to sample the gas within the outer tank and actuate an inner tank leak condition indicator in response to an increase in the content of cargo type gas.

5. A vessel as set forth in claim 1 wherein the processing means includes means for drawing gas from said source, cooling, purifying, and dehydrating, filtering, and removing the carbon dioxide content of the gas, and feeding the processed gas into said outer tank.

6. A vessel as set forth in claim 2 wherein the processing means includes means for drawing gas from said source, cooling, purifying, and dehydrating the gas, and a carbon dioxide removal plant, said processing means feeding processed flue gas to said void space and said plant, said plant removing the carbon dioxide content of the flue gas received and feeding this treated gas to the outer tank.

7. A vessel as set forth in claim 2 wherein the flue gas in the outer tank is free from carbon dioxide and the flue gas in the void space includes carbon dioxide, the pressure in the outer tank being greater than the pressure in the void space, gas analyzer means monitoring the leak condition of the outer tank wall by sampling the void space flue gas and actuating an indicating device in response to sensing a carbon dioxide p.p.m. decrease.

References Cited
UNITED STATES PATENTS

| | | | |
|---|---|---|---|
| 2,795,937 | 6/1957 | Sattler et al. | 62—7 |
| 2,830,444 | 4/1958 | Morrison | 62—50 |
| 2,863,297 | 12/1958 | Johnston | 62—45 |
| 2,922,287 | 1/1960 | Rae | 62—55 X |
| 3,050,951 | 8/1962 | Gebien | 62—45 |
| 3,159,005 | 12/1964 | Reed et al. | 62—45 |

ROBERT A. O'LEARY, *Primary Examiner.*